US011063940B2

(12) United States Patent
Hemaraju et al.

(10) Patent No.: US 11,063,940 B2
(45) Date of Patent: Jul. 13, 2021

(54) SWITCH AUTHENTICATION (71) Applicant: Hewlett Packard Enterprise Development LP, Houston, TX (US)

(72) Inventors: Shabaresha Hemaraju, Santa Clara, CA (US); Kumar Puta Swamy, Santa Clara, CA (US); Suryanarayanan Devarajan, Santa Clara, CA (US); Amit Pingale, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 264 days.

(21) Appl. No.: 15/964,947

(22) Filed: Apr. 27, 2018

(65) Prior Publication Data
US 2019/0334894 A1 Oct. 31, 2019

(51) Int. Cl.
*H04L 29/06* (2006.01)
(52) U.S. Cl.
CPC ........ *H04L 63/0876* (2013.01); *H04L 63/029* (2013.01); *H04L 63/0884* (2013.01); *H04L 63/102* (2013.01)
(58) Field of Classification Search
CPC ............... H04L 63/0876; H04L 63/029; H04L 63/0884; H04L 63/102; H04L 63/0892; H04L 63/20; H04L 63/10; H04W 12/06
USPC .......................................................... 726/4
See application file for complete search history.

(56) References Cited

U.S. PATENT DOCUMENTS

| 6,014,557 | A  | * | 1/2000 | Morton ............... H04W 12/126 455/410 |
| 7,039,404 | B2 |   | 5/2006 | Das et al. |
| 7,328,014 | B2 |   | 2/2008 | Takeda et al. |
| 7,376,742 | B1 | * | 5/2008 | Synnestvedt .......... H04L 12/66 370/395.2 |
| 7,657,624 | B2 | * | 2/2010 | Brunet ................... H04L 43/00 707/827 |
| 7,751,379 | B2 |   | 7/2010 | Verkama et al. |
| 7,822,982 | B2 | * | 10/2010 | Raikar ................. H04L 63/062 713/162 |
| 7,929,506 | B1 | * | 4/2011 | Manning ................ H04W 8/12 370/338 |
| 8,554,178 | B1 | * | 10/2013 | Swaminathan ... H04W 12/0602 455/411 |

(Continued)

OTHER PUBLICATIONS

IP Mobility: Mobile IP Configuration Guide, Cisco IOS Release 15M&T, (Research Paper), Retrieved Feb. 14, 2018, 15 Pgs.

(Continued)

*Primary Examiner* — Shahriar Zarrineh
(74) *Attorney, Agent, or Firm* — Hewlett Packard Enterprises Patent Department (57) ABSTRACT

Examples disclosed herein relate to a method comprising receiving, at a network device, an authentication message intended for a user from an authentication server. The network device may be registered with the authentication server as a source device for the user. The method may also include determining, by the network device, a management device for the user that is the intended recipient of the authentication message. The authentication server is not configured to securely connect to the management device directly. The method may also include transmitting the authentication message from the network device to the determined management device.

18 Claims, 4 Drawing Sheets

(56) References Cited

U.S. PATENT DOCUMENTS

| | | | |
|---|---|---|---|
| 8,577,044 B2* | 11/2013 | Raikar | H04L 63/062 380/278 |
| 8,595,796 B2 | 11/2013 | Stupar et al. | |
| 8,793,782 B1* | 7/2014 | Su | H04L 63/0807 726/12 |
| 8,832,811 B2* | 9/2014 | Horman | G06F 21/31 726/7 |
| 9,094,407 B1* | 7/2015 | Matthieu | H04L 63/102 |
| 9,100,214 B1* | 8/2015 | Joseph | H04L 12/4658 |
| 9,130,896 B2* | 9/2015 | Moghe | H04L 41/085 |
| 9,204,416 B2 | 12/2015 | Sugimoto et al. | |
| 9,210,534 B1* | 12/2015 | Matthieu | H04L 67/18 |
| 9,553,861 B1* | 1/2017 | Bogdanovic | H04L 63/08 |
| 9,843,687 B2* | 12/2017 | Campbell | H04L 12/1407 |
| 10,263,916 B2* | 4/2019 | Palkar | H04L 47/122 |
| 10,285,054 B2* | 5/2019 | Jaggi | H04W 12/06 |
| 10,397,873 B2* | 8/2019 | Bhanage | H04W 52/0245 |
| 2002/0178112 A1* | 11/2002 | Goeller | G07G 1/14 705/39 |
| 2004/0268140 A1* | 12/2004 | Zimmer | G06F 21/575 726/3 |
| 2005/0022183 A1* | 1/2005 | Poisson | H04L 41/0253 718/1 |
| 2005/0025125 A1* | 2/2005 | Kwan | H04L 63/10 370/352 |
| 2006/0026670 A1* | 2/2006 | Potter | G06F 21/31 726/7 |
| 2006/0168648 A1* | 7/2006 | Vank | H04L 63/205 726/4 |
| 2006/0174127 A1* | 8/2006 | Kalavade | H04W 12/06 713/176 |
| 2007/0094712 A1* | 4/2007 | Gibbs | H04L 47/20 726/3 |
| 2007/0101406 A1* | 5/2007 | Zavalkovsky | H04L 9/3273 726/4 |
| 2007/0113284 A1* | 5/2007 | O'Rourke | H04L 63/1441 726/23 |
| 2009/0064306 A1* | 3/2009 | Roy | H04L 63/102 726/12 |
| 2009/0187646 A1 | 7/2009 | Hokkyo et al. | |
| 2010/0125892 A1* | 5/2010 | Tanizawa | H04L 63/08 726/2 |
| 2010/0309878 A1 | 12/2010 | Stolvar et al. | |
| 2011/0302629 A1* | 12/2011 | Whitson | G06F 21/6218 726/3 |
| 2011/0310801 A1* | 12/2011 | Kong | H04W 8/082 370/328 |
| 2013/0139221 A1* | 5/2013 | Gundavelli | H04W 12/0608 726/4 |
| 2013/0185767 A1* | 7/2013 | Tirupachur Comerica | H04L 9/321 726/4 |
| 2013/0312073 A1* | 11/2013 | Srivastav | H04W 12/06 726/7 |
| 2014/0052860 A1* | 2/2014 | Duggal | H04L 41/00 709/225 |
| 2014/0068252 A1* | 3/2014 | Maruti | H04L 9/0866 713/162 |
| 2014/0237544 A1* | 8/2014 | Higuchi | H04L 63/168 726/3 |
| 2015/0089594 A1* | 3/2015 | Subramanian | H04W 8/205 726/4 |
| 2015/0103772 A1* | 4/2015 | Carnero Ros | H04L 45/04 370/329 |
| 2015/0244723 A1* | 8/2015 | Fan | H04W 48/18 713/171 |
| 2016/0065575 A1* | 3/2016 | Liang | H04L 63/0892 726/1 |
| 2016/0309001 A1* | 10/2016 | Ramachandran | H04L 41/082 |
| 2016/0360445 A1* | 12/2016 | Eason | H04W 48/18 |
| 2017/0048190 A1* | 2/2017 | McCann | H04L 63/0892 |
| 2017/0180374 A1* | 6/2017 | Gandhewar | H04L 63/0892 |
| 2017/0214691 A1* | 7/2017 | McCann | H04L 63/0435 |
| 2018/0198786 A1* | 7/2018 | Shah | H04L 63/083 |
| 2019/0020656 A1* | 1/2019 | Arjun | H04L 63/0892 |
| 2019/0028294 A1* | 1/2019 | Daher | H04L 12/282 |
| 2019/0124041 A1* | 4/2019 | Williams | H04N 21/41407 |
| 2019/0182249 A1* | 6/2019 | Song | H04L 61/2015 |
| 2019/0334894 A1* | 10/2019 | Hemaraju | H04L 63/029 |

OTHER PUBLICATIONS

Juniper Networks Techlibrary, Understanding Subscriber Management and BNG, (Research Paper), Jun. 2017, 114 Pgs.

* cited by examiner

SWITCH AUTHENTICATION

BACKGROUND

An authentication server is used to instruct a networking switch and/or client device to perform certain change of authorization actions (COA) apart from normal authentication accounting and authorization functions.

BRIEF DESCRIPTION OF THE DRAWINGS

The following detailed description references the drawings, wherein.

DETAILED DESCRIPTION

Examples of change of authorization (COA) issued from authentication server towards a Network Authenticating Device/Service (NAS/NAD) include the authentication server issuing COA to quarantine a client, changing the access level of a client, moving a client to a different Virtual Local Area Network (ULAN), authenticating a client, re-authenticating a client, bouncing a port, blocking the access of a port, blocking the access of a client, changing the role of the client connected to the port, etc.

Typically, the authentication server communicates directly with each switch and/or client device that sends authentication messages to the authentication server. In current network design, if a network deployment has N number of Network authentication server/devices (NAS/NAD, representing a network device), all of these devices may need to communicate to the authentication server and listed as a Network Authentication service (NAS) device, in order to be able to receive and execute change of authorization issued from the authentication server.

One potential issue with this architecture is that it assumes network connectivity from all the Network Devices to Authentication servers. Accordingly, it may be beneficial to reduce the number of connections used in transmitting authenticated messages to an authentication server.

A second potential issue is that each device must support the protocol used by the authentication server. For example, a Remote Authentication Dial in service (RADIUS) server may be used to issue a Change of authorization (CoA) message to the device.

Embodiments of the present disclosure incorporates a network function into one single network device, such as a wired or/and wireless controller/aggregator/branch gateway, as a unified point for multiple other network devices (example switches) to communicate with the authentication server. For example, the wired or/and wireless Controller/aggregator/branch gateway may be configured as the network authentication server with the authentication server and there may be one direct physical connection between the wired or/and wireless Controller/aggregator/branch gateway and the authentication server for multiple other network devices such as network switches, Access point, access port.

In some aspects, there may be one wired or/and wireless Controller/aggregator/branch gateway serving as the authentication point for each switch in the network. In some embodiments, there may be a number of wired or/and wireless Controller/aggregator/branch gateway less than the number of switches. In this manner, the number of secure direct physical communication required by each networking device will be reduced.

Moreover, the authentication server may communicate directly with the wired or/and wireless Controller/aggregator/branch gateway and the wired or/and wireless Controller/aggregator/branch gateway may then transmit the authentication message to each network device (switch) that the it manages. Because the wired or/and wireless Controller/aggregator/branch gateway is communicating with the authentication server, the controller will support the authentication protocol used by the authentication server, but the switches themselves do not have to support the authentication protocol. Accordingly, in some embodiments the wired or/and wireless Controller/aggregator/branch gateway may retransmit the authentication message to the switch using the same protocol the authentication message was received in, while in other embodiments the wired or/and wireless Controller/aggregator/branch gateway will transmit the authentication message to the switch using the a different protocol then the protocol that the authentication message was received.

A method for server authentication may include receiving, at a network device, an authentication message intended for a user from an authentication server, wherein the network device is registered with the authentication server as a source device for the user. The method may also include determining, by the network device, a management device for the user that is the intended recipient of the authentication message, wherein the authentication server is not configured to securely connect to the management device directly and transmitting the authentication message from the network device to the determined management device.

Figure 1A:
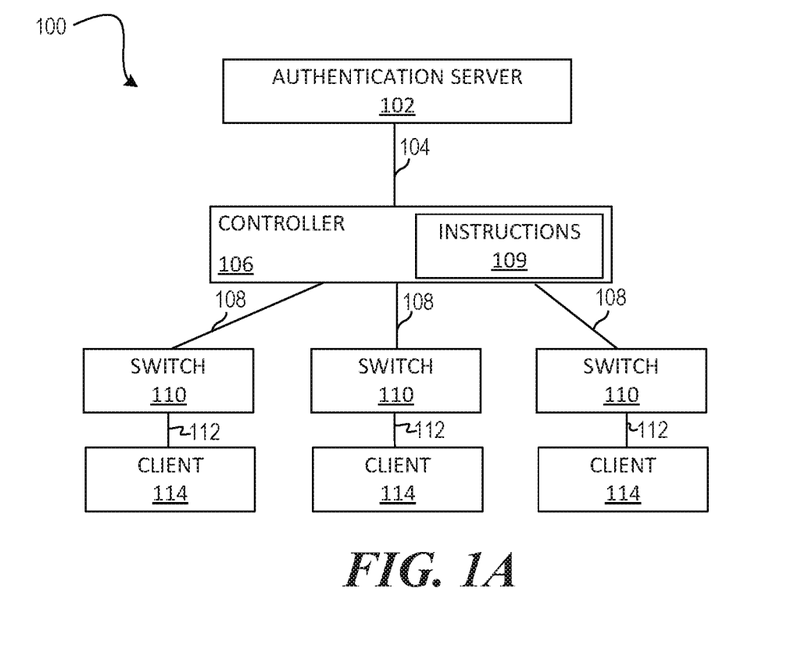
FIG. 1A is a block diagram of an example configuration where switch authentication may be useful.

FIG. 1 is a block diagram of an example system 100 where switch authentication may be useful. System 100 includes an authentication server 102, such as a RADIUS server. The authentication server may transmit authenticated messages over a secure connection 104, to a wired or/and wireless controller/aggregator/branch gateway 106. The secure connection may be, for example, a wired network connection, a wireless network connection, etc. Wired or/and wireless controller/aggregator/branch gateway (hereinafter referred to "controller" for the sake of brevity) may be a network access server (NAS), etc.

In some aspects, controller 106 may be a firewall or intrusion protection system. In some aspects, system 100 may also include a dedicated network device (e.g., gateway or router) or a combination of network devices that implement a firewall or intrusion protection system. In these aspects, the controller 106 and instructions 109 may be part of the dedicated network device. Of course, one or more network devices in system 100 may work together to provide specific security requirements as needed for different portions (e.g., subnets) of a network.

Controller 106 may be connected, via connection 108, to one or more network switches 110. Network switches 110 may include a server, access point, router, or other device configured to provide for local computational resources and/or to facilitate communication amongst networks and devices. For example, network switch 110 may be one or more physical local hardware devices configured to communicate with clients 114 and/or other networks. Network switches 110 may also facilitate communication between other external applications, data sources, services and networks.

Each network switch 110 may be connected, via connection 112, to one or more clients 114. Client devices 114 may be computing systems such as desktop computer, tablet computer, mobile phone 104D, laptop computer, Internet of Things ("IoT") device(s) that may be configured to send and receive information via a network to access network services or interact with a remote web browser application (e.g., to receive configuration information) and/or other types of computing systems generically shown as client device 114. In some aspects, one or more network devices (i.e. network switch 110, etc.) may have end wired/wireless client connected to them (i.e. clients 114) and these network devices are connected behind a network translation function performed by aggregator/controller/gateway.

The connection 112 may be a wired connection, wireless connection, virtual connection, etc. Wireless networks may utilize a variety of protocols and communication techniques (e.g., Global System for Mobile Communications ("GSM") based cellular network) wireless fidelity Wi-Fi networks, Bluetooth, Near Field Communication ("NFC"), and/or other suitable radio-based networks as would be appreciated by one of ordinary skill in the art upon viewing this disclosure. Network 108 may also employ any number of network communication protocols, such as Transmission Control Protocol ("TCP") and Internet Protocol ("IP"). Although not explicitly shown in FIG. 1, network 108 may include a variety of network devices, such as servers, routers, network switches, and/or other network hardware devices configured to transport data over networks. Any, or all of these devices may be adversely affected by a change to a network configuration that is not performed properly.

In order to transmit and/or receive an authenticated message, the authentication server may be configured as an authenticated source for any given switch 110. For example, the authentication server may be configured as a care of address (CoA) source for a switch 110. However, as described above, there may be a variety of issues with that architecture. Instead, in system 100, the controller 106 may be configured as the authentication source for the connected switch 110.

Accordingly, rather than transmit authenticated messages from the authentication server 102 directly to the switch 110, the authentication server 102 may transmit authenticated messages to the controller 106. The controller 106 may, in turn, route the authenticated messages to the designated switch 110, which in turn routes the authenticated messages to the designated client 114. The controller 106, may have a set of instructions 109 to perform this task. These instructions are discussed in further detail below in regards to FIG. 1B.

The authenticated message may be, for example a message to quarantine a client, change the access level of a client, move a client to a different Virtual Local Area Network (VLAN), authenticate a client, re-authenticate a client, bounce a port, block the access of a port, block the access of a client, etc.

Figure 1B:
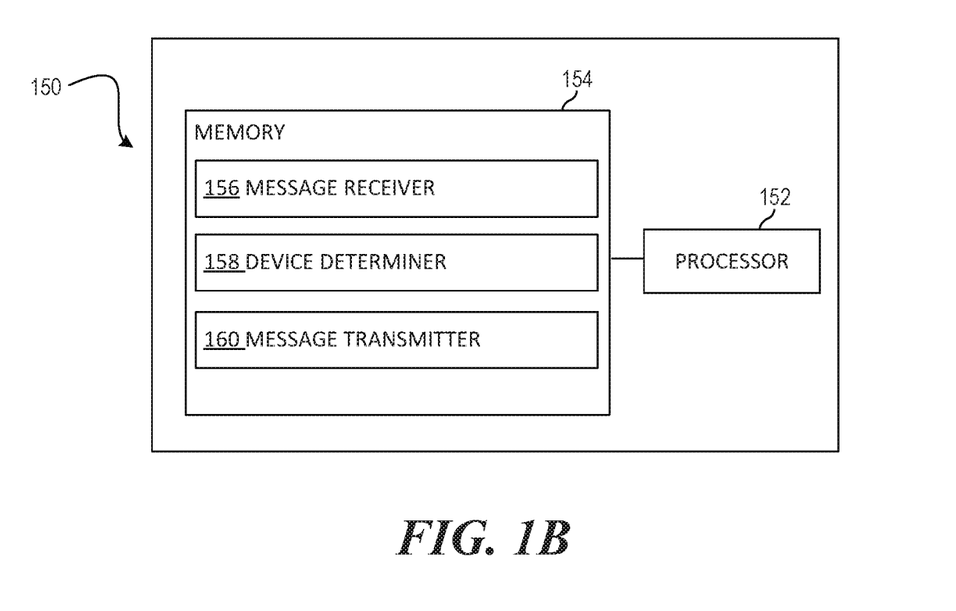
FIG. 1B is a flowchart of another example system for switch authentication.

Turning now to FIG. 1B, a block diagram of an example system 150 for server authentication. System 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for message receiver 156, device determiner 158, message transmitter 160, and/or other components. According to various implementations, system 150 may be implemented in hardware and/or a combination of hardware and programming that configures hardware. Furthermore, in FIG. 1 and other Figures described herein, different numbers of components or entities than depicted may be used.

As discussed above, the authentication server 102 may transmit a authenticated message designated for a client device 114 and/or a switch device 110 via the controller 106. Processor 152 may execute message receiver 156 to receive an authentication message intended for a user from an authentication server. The network device, such as controller 106, may be registered with the authentication server 102 as a source device for the user, such as client 114 and/or switch 110. The network device may transmit an acknowledgement message back to the authentication server over connection 104.

Processor 152 may execute device determiner 158 to determine a management device, such as a switch 110, for the user, such as client 114, that is the intended recipient of the authentication message. Upon receiving the authenticated message, the controller 106 may look up the source switch 110 for the user. The controller may look up the source switch 110 for the user by looking up the source tunnel used for this user. The authentication server may only be aware of the controller 106, since that is where actual source of authentication is taking place. Moreover, the authentication server may not be configured to communicate directly to the switch 110 and/or client 114.

Processor 152 may execute message transmitter 160 to transmit the authentication message from the network device to the determined management device. The controller may then relay the authenticated message to this switch 110 in the same format that it was received from the secure server. In some aspects, the switch 110 and/or client 114 may not support the format and/or protocol used by the authentication server 102. In these embodiments, the controller 106 may send the authenticated message to the switch 100 using a format supported by the switch 110 and or client 114, such as a proprietary format. This new packet will have the information to perform the authorization event(s). This will be discussed below in regards to FIG. 3.

Figure 2:
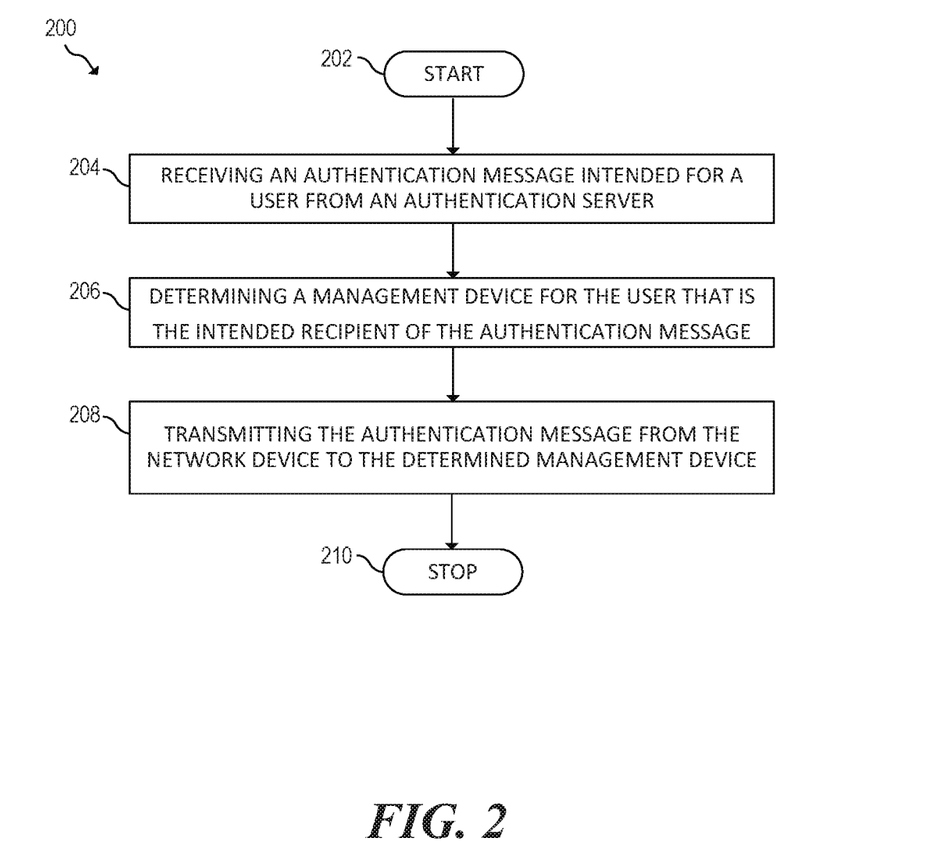
FIG. 2 is a flowchart of an example method for switch authentication.
Figure 3:
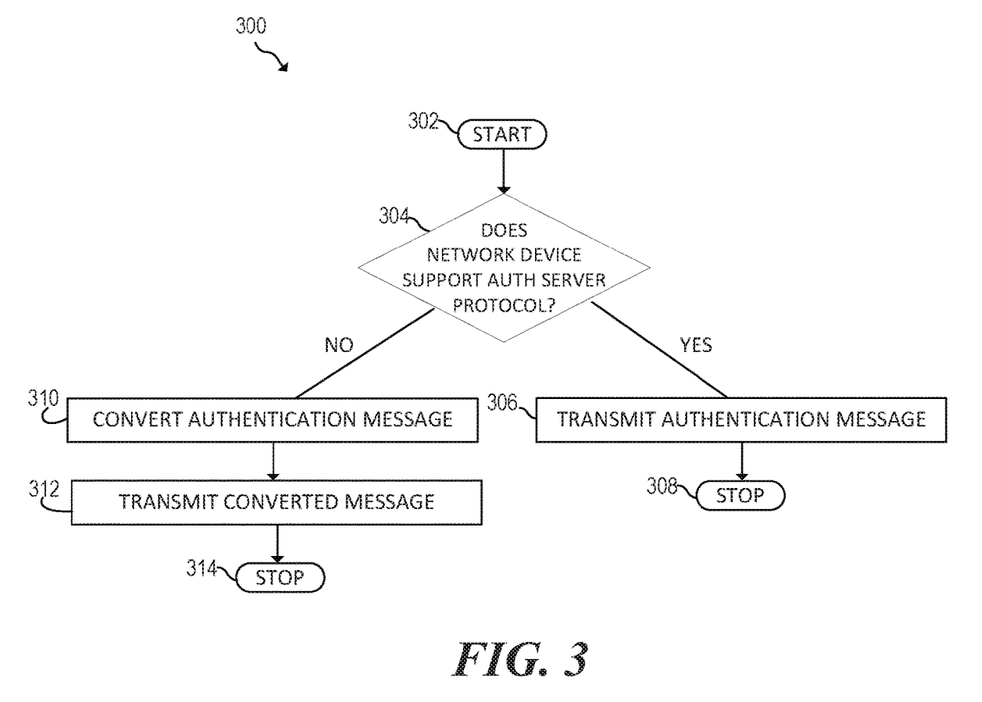
FIG. 3 is a flowchart of another example method for determining whether a client device supports an authentication protocol.

Referring now to FIGS. 2-3, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples.

Thus, the present disclosure merely sets forth possible examples of implementations, and many variations and modifications may be made to the described examples.

FIG. 2 is a flowchart of an example method 200 for switch authentication. Method 200 may start at block 202 and continue to block 204, where the method 200 may include receiving, at a network device, an authentication message intended for a user from an authentication server, wherein the network device is registered with the authentication server as a source device for the user. The authentication message may be a change of authentication message and the authentication server may be a change of authorization server. The authentication message may be an instruction to perform one of: an action to Quarantine the user, an action to elevate Access by moving the user to a different VLAN; an action to Re-authenticate a user device associated with the user; an action to bounce a port accessible by the user device; or an action to block access of the user device.

At block 206, the method may include determining, by the network device, a management device for the user that is the intended recipient of the authentication message. The user may be determined by looking up a source tunnel for the user. The management device may be a level 2 switch that is firewalled on the network device. The authentication server may not be configured to securely connect to the management device directly. The management device may manages a user device associated with the user and/or may have a secure direct connection to the user device. The secure direct connection to the user device may be over a wired interface and the authentication message is associated with a wired port of the wired interface. The secure direct connection to the user device may be over a wireless interface and the authentication message is associated with a wired port of an access point connected to the user device.

At block 208, the method may include transmitting the authentication message from the network device to the determined management device. The authentication message transmitted to the network device may be identical to the authentication message received from the authentication server. The method may proceed to block 210, where the method may end.

FIG. 3 is a flowchart of an example method 300 for determining whether a client device supports an authentication protocol. As discussed above, in some aspects the client device and/or switch may not support the authentication protocol used by the authentication server. In these aspects, the controller may convert the authentication message into a format supported by the client device and/or switch. Method 300 may start at block 302 and continue to block 304, where the method 300 may include determining whether a network device, such as the switch 110 and/or client device 114 discussed above in reference to FIG. 1, supports the authentication protocol used in the authentication message transmitted by the authentication server to the controller. If it is determined that the network device does support the authentication protocol (YES branch of block 304), then at block 306 the method may include transmitting the authentication message from the controller to the network device. The transmitted message may be similar but not exactly the same as the message received at the controller from the authentication server. The method may proceed to block 308, where the method may end.

If it is determined that the network device does not support the authentication protocol (NO branch of block 304), then at block 310, the method may include converting the authentication message into a formal using a protocol supported by the network device. At block 312, the method may include transmitting the converted message to the network device. The method may proceed to block 314, where the method may end.

Figure 4:
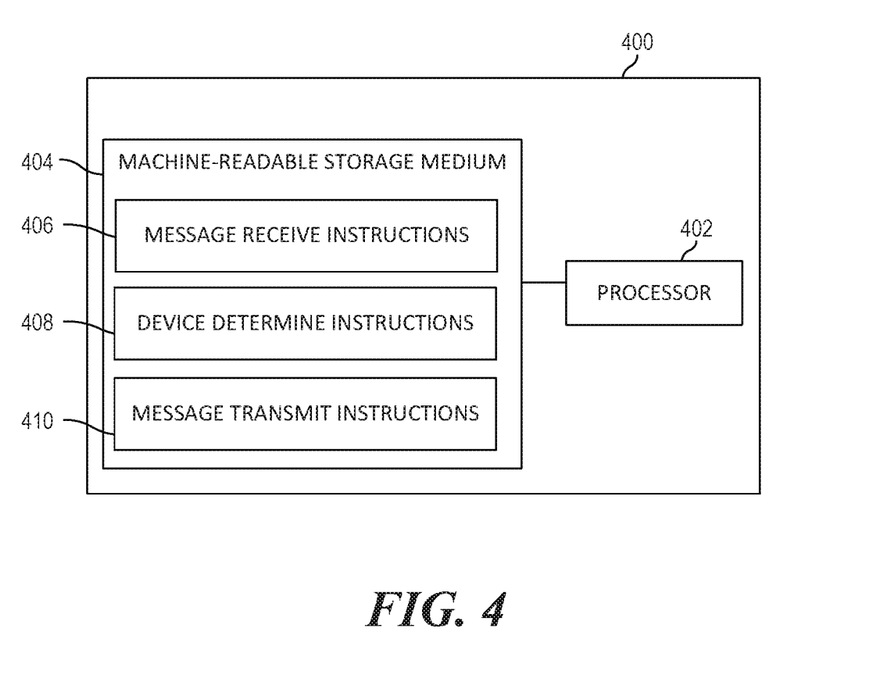
FIG. 4 is a flowchart of another example system for switch authentication.

FIG. 4 is a block diagram of an example system 400 for network authentication. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408 and 410 for server authentication. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, message receive instructions 406, when executed by a processor (e.g., 402), may cause system 400 to receive an authentication message intended for a client device from an authentication server. The network device may be registered with the authentication server as a source device for the client device. The authentication message may be a change of authentication message and the authentication server may be a change of authorization server. The authentication message may be to perform one of: an action to Quarantine the user, an action to elevate Access by moving the user to a different VLAN; an action to Re-authenticate a user device associated with the user; an action to bounce a port accessible by the user device; or an action to block access of the user device.

Device determine instructions 408, when executed by a processor (e.g., 402), may cause system 400 to determine a management device for the client device that is the intended recipient of the authentication message. The authentication server may not be configured to securely connect to the management device directly. The user may be determined by looking up a source tunnel for the user. The management device may be a level 2 switch that is firewalled on the network device.

The authentication server may not be configured to securely connect to the management device directly. The management device may have a secure direct connection to the user device. The secure direct connection to the user device may be over a wired interface and the authentication message may be associated with a wired port of the wired interface. The secure direct connection to the user device may be over a wireless interface and the authentication message may be associated with a wired port of an access point connected to the user device.

Message transmit instructions 410, when executed by a processor (e.g., 402), may cause system 400 to transmit the authentication message from the network device to the determined management device. The authentication message transmitted to the network device may be identical to the authentication message received from the authentication server.

The foregoing disclosure describes a number of examples for server authentication. The disclosed examples may include systems, devices, computer-readable storage media, and methods for server authentication. For purposes of explanation, certain examples are described with reference to the components illustrated in FIGS. 1-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
receiving, at a network device, an authentication message intended for a user from an authentication server, wherein the network device is registered with the authentication server as a source device for the user and the authentication message is a Change of Authorization (CoA) message associated with an authorization event;
determining, by the network device, a management device for the user that is the intended recipient of the authentication message, wherein the authentication server is not configured to securely connect to the management device directly and the management device does not support a protocol used by the authentication server;
determining, that the network device does not support CoA messages;
converting the authentication message into a proprietary message having a proprietary message format supported by the network device and the management device, wherein the proprietary message information to perform the authorization event; and
transmitting the authentication message from the network device to the determined management device.

2. The method of claim 1 wherein the management device manages a user device associated with the user.

3. The method of claim 1 wherein the management device has a secure direct connection to the user device.

4. The method of claim 1 wherein the authentication server is a change of authorization server.

5. The method of claim 1, comprising:
determining, by the management device, the user by looking up a source tunnel for the user.

6. The method of claim 1 wherein the authentication message transmitted to the network device is identical to the authentication message received from the authentication server.

7. The method of claim 1 wherein a secure direct connection to the user device is over a wired interface and the authentication message is associated with a wired port of the wired interface.

8. The method of claim 1 wherein a secure direct connection to the user device is over a wireless interface and the authentication message is associated with a wired port of an access point connected to the user device.

9. The method of claim 1 wherein the management device is a level 2 switch that is firewalled on the network device.

10. The method of claim 1 wherein the authentication message is to perform one of: an action to Quarantine the user, an action to elevate Access by moving the user to a different VLAN; an action to Re-authenticate a user device associated with the user; an action to bounce a port accessible by the user device; or an action to block access of the user device.

11. A system comprising:
a message receiver to receive an authentication message intended for a user from an authentication server, wherein the network device is registered with the authentication server as a source device for the user and the authentication message is a Change of Authorization (CoA) message associated with an authorization event;
a device determiner to determine a management device for the user that is the intended recipient of the authentication message, wherein the authentication server is not configured to securely connect to the management device directly and the management device does not support a protocol used by the authentication server;
a message transmitter to:
determine that the network device does not support CoA messages;
convert the authentication message into a proprietary message having a proprietary message format supported by the network device and the management device, wherein the proprietary message information to perform the authorization event; and
transmit the authentication message from the network device to the determined management device.

12. The system of claim 11, wherein the device determiner is to:
determine the user by looking up a source tunnel for the user.

13. The system of claim 11 wherein the authentication message transmitted to the network device is identical to the authentication message received from the authentication server.

14. A non-transitory machine-readable storage medium encoded with instructions, the instructions executable by a processor of a system to cause the system to:

receive an authentication message intended for a client device from an authentication server, wherein the network device is registered with the authentication server as a source device for the client device;

determine a management device for the client device that is the intended recipient of the authentication message, wherein the authentication server is not configured to securely connect to the management device directly and the management device does not support a protocol used by the authentication server;

determine that the network device does not support CoA messages;

convert the authentication message into a proprietary message having a proprietary message format supported by the network device and the management device, wherein the proprietary message information to perform the authorization event; and transmit the authentication message from the network device to the determined management device.

15. The non-transitory machine-readable storage medium of claim 14 wherein the management device manages the client device associated with a user.

16. The non-transitory machine-readable storage medium of claim 14 wherein the management device has a secure direct connection to the client device.

17. The non-transitory machine-readable storage medium of claim 14 wherein the authentication server is a change of authorization server.

18. The non-transitory machine-readable storage medium of claim 14 wherein the secure direct connection to the client device is over a wired interface and the authentication message is associated with a wired port of the wired interface.

* * * * *